(12) United States Patent
Cavallerano et al.

(10) Patent No.: US 6,222,926 B1
(45) Date of Patent: *Apr. 24, 2001

(54) METHOD AND DEVICE FOR PROVIDING CONTROLLED ACCESS VIDEO SIGNALS WITHOUT PROVIDING A SIGNAL IN THE CLEAR

(75) Inventors: Alan Cavallerano, White Plains; Carlo Basile, Ossining; Jill Forer Goldenberg, New Rochelle, all of NY (US)

(73) Assignee: Philips Electronics North America Corporation, New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/768,492

(22) Filed: Dec. 18, 1996

(51) Int. Cl.⁷ ............................... H04N 7/167; H04N 1/44
(52) U.S. Cl. ............................................ 380/214; 380/245

(58) Field of Search ................................. 380/21, 10, 14, 380/20, 214, 245

(56) References Cited

U.S. PATENT DOCUMENTS

| | | | |
|---|---|---|---|
| 5,208,857 | * 5/1993 | Lebrat | 380/14 |
| 5,297,201 | * 3/1994 | Dunlavy | 380/6 |
| 5,321,747 | * 6/1994 | Lindholm | 380/7 |
| 5,321,748 | * 6/1994 | Zeidler et al. | 380/14 |
| 5,621,799 | * 4/1997 | Katta et al. | 380/48 |
| 5,636,279 | * 6/1997 | Katta et al. | 380/20 |

* cited by examiner

Primary Examiner—Stephen C. Buczinski
(74) Attorney, Agent, or Firm—Laurie E. Gathman

(57) ABSTRACT

A LCD display device for receiving encrypted video data and for decrypting the video data such that a signal is not provided "in the clear" before receipt by the display device. The video data is encrypted within a row of video and decrypted at the display. Alternatively the rows are encrypted by altering the time sequence of display of each row.

15 Claims, 9 Drawing Sheets

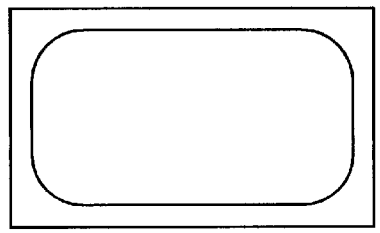
FIG. 5a
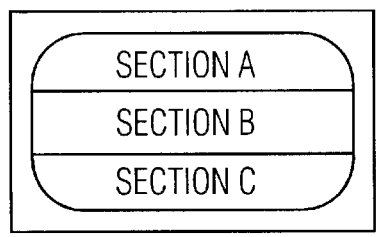
FIG. 5b
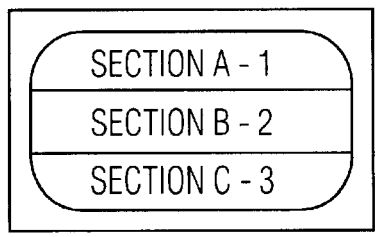
FIG. 5c
| SECTION | | | | | | | | | |
|---|---|---|---|---|---|---|---|---|---|
| A | 1 | 1 | 1 | 1 | 1 | 1 | 1 | 1 | |
| B | 2 | 2 | 2 | 2 | 2 | 2 | 2 | 2 | ... |
| C | 3 | 3 | 3 | 3 | 3 | 3 | 3 | 3 | |
| | FRAME 1 | FRAME 2 | FRAME 3 | FRAME 4 | FRAME 5 | FRAME 6 | FRAME 7 | FRAME 8 | |
FRAME TIME →
FIG. 5d

| SECTION | | | | | | | | |
|---|---|---|---|---|---|---|---|---|
| A | 1 | 1 | 1 | 1 | 1 | 1 | 1 | 1 |
| B | 2 | 2 | 2 | 2 | 2 | 2 | 2 | 2 |
| C | 3 | 3 | 3 | 3 | 3 | 3 | 3 | 3 |
| | FRAME 1 | FRAME 2 | FRAME 3 | FRAME 4 | FRAME 5 | FRAME 6 | FRAME 7 | FRAME 8 |

FRAME TIME →

FIG. 6a

| SECTION | STATE A | STATE B | STATE C | STATE D | STATE E | STATE F | STATE A | STATE F |
|---|---|---|---|---|---|---|---|---|
| A | 1 | 1 | 2 | 2 | 3 | 3 | 1 | 3 |
| B | 2 | 3 | 1 | 3 | 1 | 2 | 2 | 2 |
| C | 3 | 2 | 3 | 1 | 2 | 1 | 3 | 1 |
| | FRAME | FRAME | FRAME | FRAME | FRAME | FRAME | FRAME | FRAME |

FRAME TIME →

FIG. 6b

| SECTION | STATE A | STATE B | STATE D | STATE F | STATE E | STATE C | STATE A | STATE C |
|---|---|---|---|---|---|---|---|---|
| A | 1 | 1 | 2 | 3 | 3 | 2 | 1 | 2 |
| B | 2 | 3 | 3 | 2 | 1 | 1 | 2 | 1 |
| C | 3 | 2 | 1 | 1 | 2 | 3 | 3 | 3 |
| | FRAME 1 | FRAME 2 | FRAME 3 | FRAME 4 | FRAME 5 | FRAME 6 | FRAME 7 | FRAME 8 |

FRAME TIME →

FIG. 6c

METHOD AND DEVICE FOR PROVIDING CONTROLLED ACCESS VIDEO SIGNALS WITHOUT PROVIDING A SIGNAL IN THE CLEAR

BACKGROUND OF THE INVENTION

1. Field of the Invention

The invention relates in general to display devices and in particular to scrambling and encrypting devices and methods which prevent a signal "in the clear" at the display device.

2. Description of Related Art

To avoid pirating of video, video is scrambled or encrypted by the provider to protect against unauthorized viewing. The term "scrambling" typically means the altering of an analog signal such that it cannot be displayed in a conventional sense without the proper descrambling operation. Examples of scrambling techniques include but are not limited to sync suppression, active line rotation, and line shuffling. The term "encryption" typically is used to describe the operation of altering a digital sequence usually by multiplying it by a pseudo-random sequence. In order to recover the original signal, a "key" is required. An example of this technique is the Data Encryption Standard (DES).

An example of a typical MPEG display system without encryption is shown in FIG. 1. An example of a typical MPEG display system with encryption is shown in FIG. 2, where it should be noted that an encrypted sequence "BLCFADGIHEKJ" is created.

A video signal is often scrambled or encrypted so that without proper authorization, it is in an unusable form. However, if the consumer premises are granted authorization, then typically at interfaces which are accessible to the consumer, such as at the output of a cable converter box or the "video output" jacks of a receiver, the video signal is descrambled or decrypted and hence is "in the clear" (See FIG. 3). There are many types of display devices available today. There is the generally well known cathode ray tube display devices (CRT), and discrete display devices such as digital light modulators or deformable mirror spatial light modulator (DMD), liquid crystal displays (LCD), and plasma displays. Each of these displays have the problems associated with an unauthorized user simply recording the video "in the clear" from the output of the cable converter box or the "video output" jacks of a television receiver. For ease of description reference will be had to the operation of a LCD.

A liquid crystal display device includes liquid crystal picture elements ("pixels") arrayed in rows and columns. In an LCD display system, the discrete display device is illuminated on a "row" or line basis, due to the matrix addressing scheme typically employed. Hence, a particular row is illuminated and then another row is illuminated until an entire frame is created. For example, in a particular Philips LCD display device there are 480 columns by 480 rows worth of pixels. To load the 480 pixels required for a given row, column drivers are required. The 480 rows are then activated sequentially to create a picture (or a frame).

FIG. 4(a) shows a schematic diagram of an LCD display device. Referring to FIG. 4(a), the display device, which is intended to display video, for example television pictures, includes an active matrix liquid crystal color display panel 10. The panel 10 comprises two spaced, transparent and insulating supporting plates, for example of glass, with twisted nematic liquid crystal disposed therebetween and has a large number of liquid crystal picture elements with associated switching elements and memory elements (e.g. capacitors) arranged in rows and columns which are addressed via first and second sets of crossing address conductors with each picture element being connected with a respective address conductor of each set. The first set comprises row address conductors extending in the row direction. Conductors of the second set extend generally in the column direction and hereinafter will be referred to as column address conductors. Each column address conductor is connected with a respective picture element in each row.

In known active matrix liquid crystal display devices, the row address conductors serve as scanning electrodes and are controlled by a row driver circuit 15, comprising a shift register circuit, which applies a selection signal to each row conductor sequentially in turn during a respective row address period. In synchronism with the selection signals, achieved by means of the timing and control circuit 16, data (video) signals, obtained by sampling a TV line with serial to parallel conversion, are applied to the column address conductors from a column driver circuit 17 connected to the output of a video processing circuit 18 to produce a required display effect from the rows of picture elements as they are scanned. Thus the video information for a single line is loaded into the column driver circuit 17 and depending on the row addressed by the row driver circuit 15, this row is loaded with video information. The individual display effects of the picture elements, addressed one row at a time, combine to build up a complete picture in one field, the picture elements being addressed again in a subsequent field. This sequential loading of the array 10 provides a signal "in the clear" which is easily pirated.

SUMMARY OF THE INVENTION

It is an object of the invention to eliminate the signal "in the clear" in an LCD display device.

It is another object of the invention to eliminate the signal "in the clear" without requiring substantial modification of the LCD display device.

A further object of the invention is to eliminate the signal "in the clear" while minimizing temporal artifacts.

Achievement of these and other objects is based on the realization that to load the memory elements with pixel data it is not necessary to do so in a sequential order. Instead the memory elements are loaded in an encrypted sequence in accordance with an encryption "key".

These objects are achieved in a first embodiment of the invention by encrypting the pixel data within a line or row of the display device and placing it in a register or other storage device of the column driver circuit and decrypting the pixel data by causing the register or other storage device to place decrypted data, decrypted in accordance with a decryption key, in the appropriate locations of the column driver circuit.

In a second embodiment of the invention, the row sequence or time order of the display of the rows is encrypted so that the row driver circuit must load the appropriate row in accordance with the decryption key.

In a third embodiment of the invention both the pixel sequence within a row and the row sequence are encrypted and both the row and column decoders load the LCD line by line in accordance with the encryption key.

In a fourth embodiment of the invention the encryption is performed to limit the temporal artifacts that occur due to varying the row sequence. This is achieved by partitioning each frame of video into a plurality of partitions. Each partition having the rows within the partition in an encrypted sequence but the time order of the display of the partitions is controlled.

Still other objects and advantages of the invention will in part be obvious and will in part be apparent from the specification.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

BRIEF DESCRIPTION OF THE DRAWINGS

For a fuller understanding of the invention reference will be had to the following description taken in connection with the accompanying drawings, in which:

FIGS. 5a–d show a preferred embodiment of the invention wherein the video sequence is partitioned into sections.

FIGS. 6a–c show the time allocation of the sections for each frame.

DESCRIPTION OF THE PREFERRED EMBODIMENTS

Figure 1:
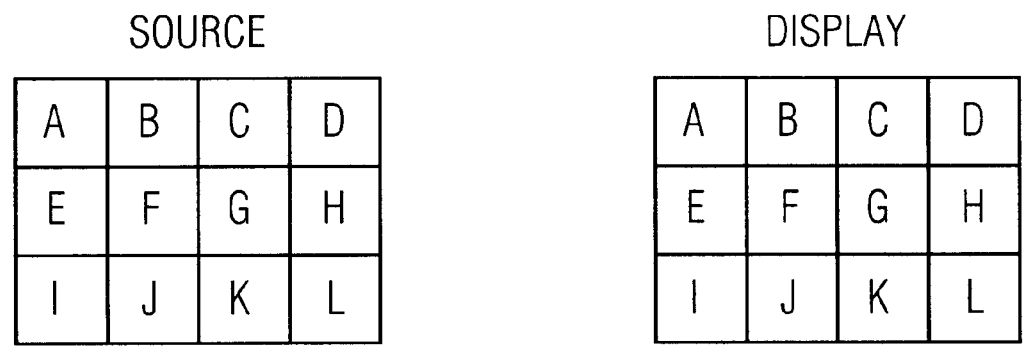
FIG. 1 shows a typical MPEG display system.
Figure 1:
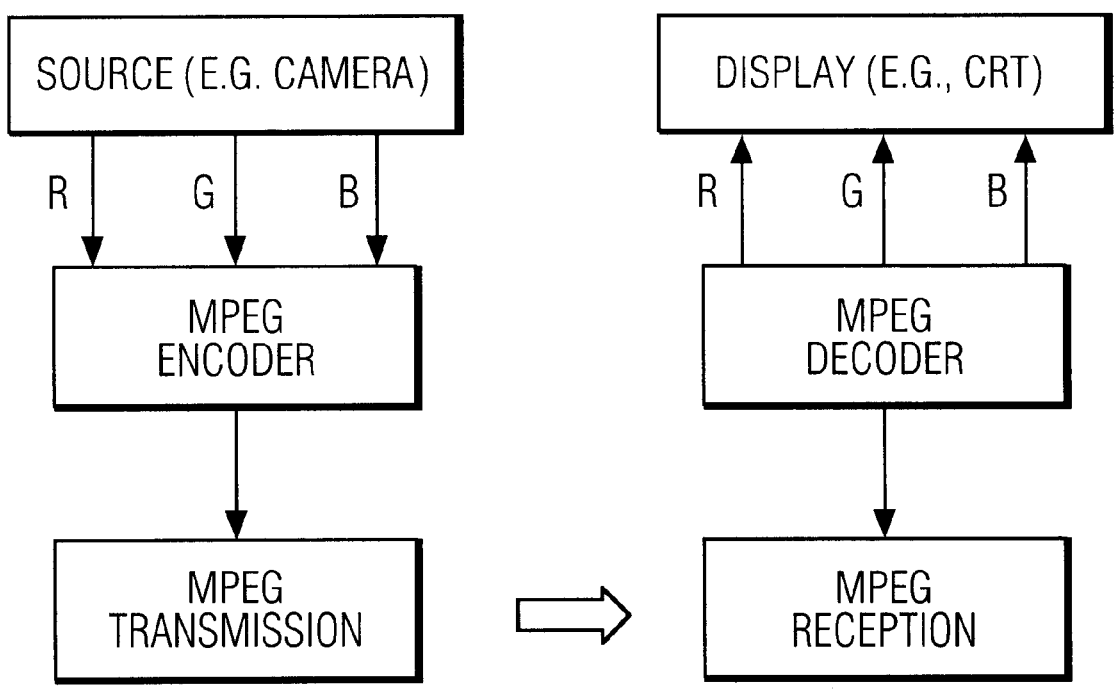
Figure 2:
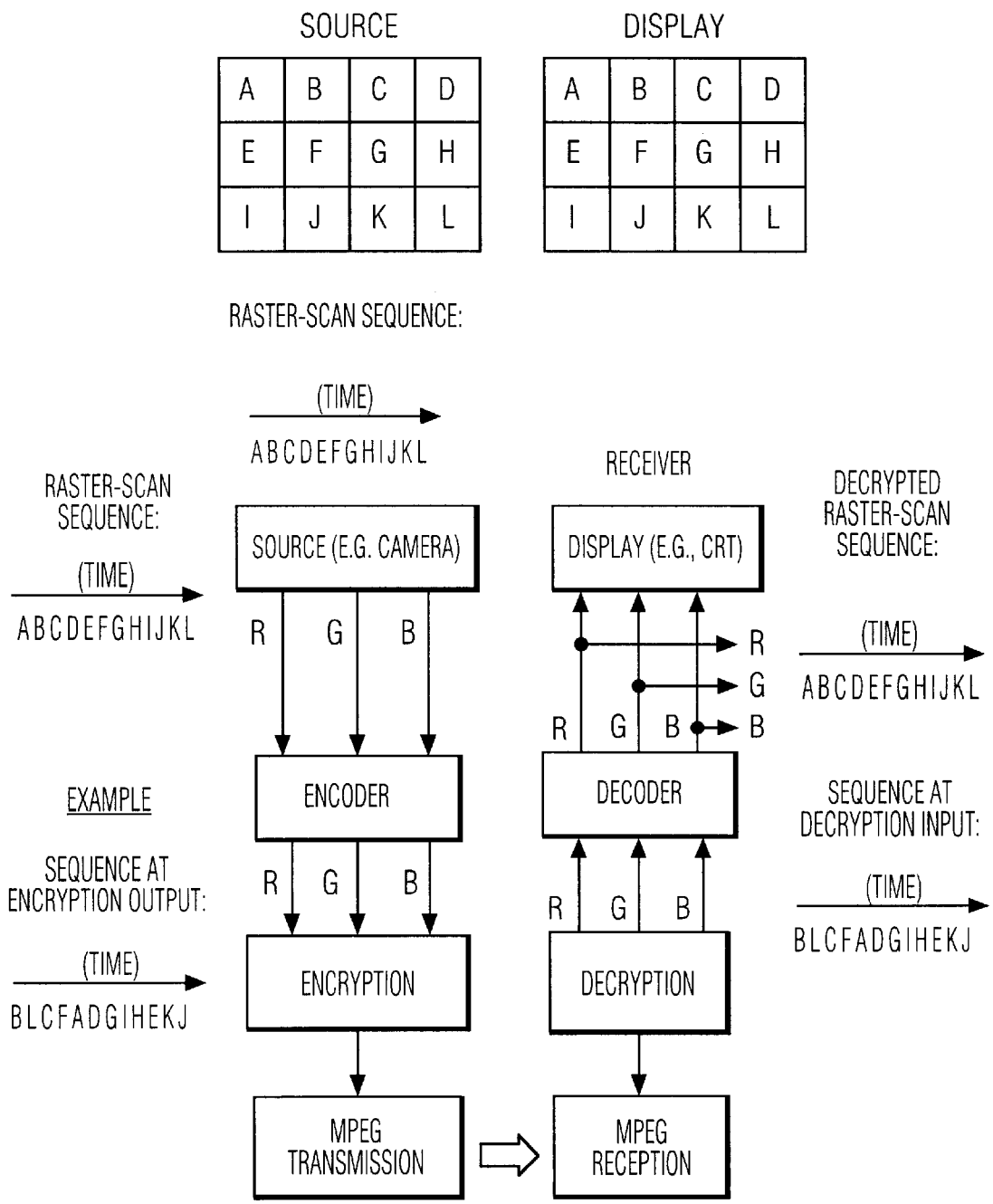
FIG. 2 shows a typical MPEG display system with encryption.
Figure 3:
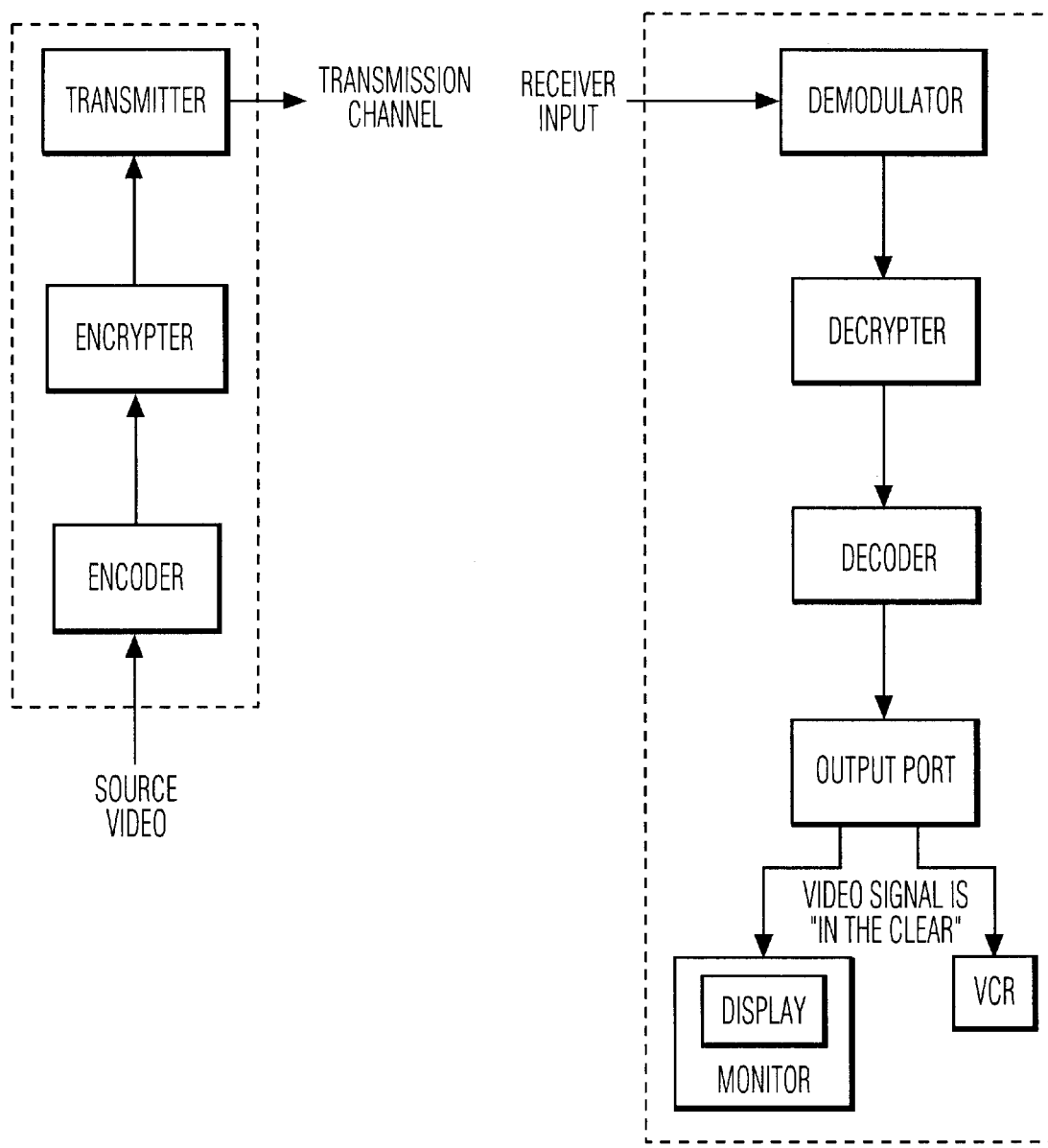
FIG. 3 shows the availability of a signal in the clear in a MPEG encryption scheme.
Figure 4A:
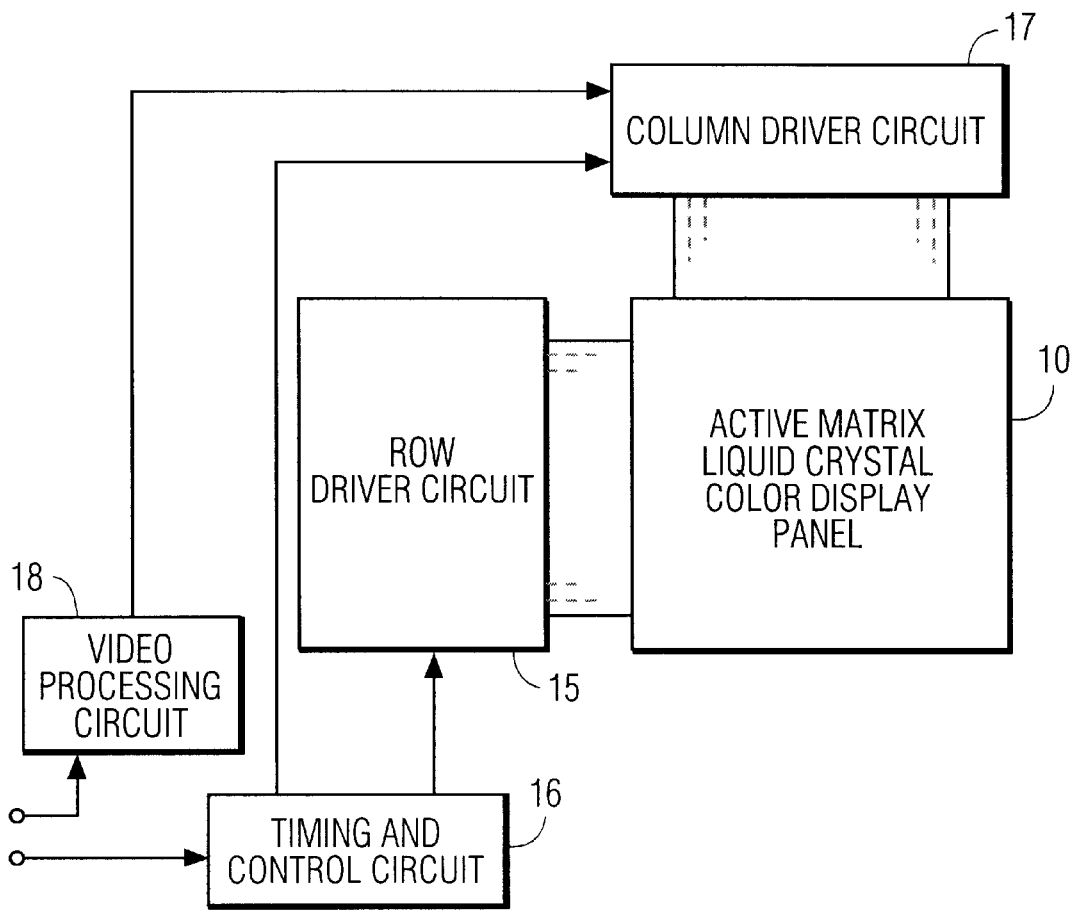
FIG. 4(a) is a diagram of a known liquid crystal display device.

As explained above, the LCD embodiment shown in FIG. 4(a) stores pixel data in the driver circuit 17. In the prior art, the column driver circuit 17 contains a number of memory elements corresponding to the number of active pixels on any given active line (row). The pixel data for a given line (row) are transferred to the array 10 in line-sequential order, under control of the line (row) driver circuit 15. The row driver circuit 15 addresses the row of picture elements in the array 10 for the desired line. The pixel data stored in the column driver circuit 17 are then transferred to array 10 line-by-line. The activation of the LCD occurs on a line-by-line basis which in succession creates a field (or frame) of video information. All of the timing for the system is under control of the timing and control circuit 16. The loading of the array can be referred to as a "write" operation, and the reading of the array corresponds to the a "read" operation, both are done on a line-by-line basis. The timing and control circuit 16 provides the appropriate write and read enable signals.

In an LCD system the pixel data must be loaded into the display array 10 on a line-by-line basis. Thus to avoid a "signal in the clear" in a first embodiment of the invention any encrypted video pixel data still must enter the LCD at least in a group that comprises a line, although within the line, the pixel data can be encrypted hence providing some level of security.

In a second embodiment of the invention the encrypting is also performed throughout the lines of the video, e.g. instead of the lines being activated sequentially 1–480, they are activated in a random order, e.g. 10, 400, 2, 276 . . . , and a greater level of security is provided. There are some restrictions that must be imposed for this type of encryption in order to avoid temporal artifacts. Any given line that is activated for frame n, should not be activated for frame n+1 in a period of time that deviates too significantly from the frame period. In other words, if line 251 is activated last in frame n, it should not be activated first in frame n+1 otherwise temporal artifacts can occur. The potential for temporal artifacts can be minimized by controlling the allowed line-by-line randomness of the encryption at the source by permitting encryption to take place within predetermined boundaries only. This limitation will guarantee the maximum and minimum intervals that any given line can be activated frame to frame.

FIGS. 5a–d depict such control of the encryption. FIG. 5a shows a typical display device. FIGS. 5b and c show a preferred embodiment of the invention where the display device is broken up into predetermined boundaries denoted by sections A, B and C. Each section has a time order associated with it. In this example, section A is scanned first (1), section B is scanned second (2), followed by section C last (3). Assume section A contains pixel rows 1,2,3,4,5, section B contains pixel rows 6,7,8,9,10 and Section C contains pixel rows 11,12,13,14,15. This segregation of lines into sections takes place in theory at the encoder (transmission side), in anticipation of an LCD receiving the transmission. This is practical for implementations such as Electronic Cinema. In a first embodiment (FIGS. 5c and d) of the invention the time order of the sections remains fixed, e.g. the rows of section A are activated first, rows of section B are activated second and rows of section C are activated third. The rows within each section are encrypted which provides a greater degree of protection from unauthorized users than merely encrypting the pixels within a row and there are little temporal artifacts which could arise. Thus section A can be encrypted by alternating the sequence of lines in Section A. For example, for frame 3, section A may transmit in time order rows 5,3,1,2,4 and in frame 8, the time order may be lines 2,3,4,1,5.

In another preferred embodiment of the invention a greater degree of randomness is permitted and thus a greater level of security. In this embodiment the sections A, B, and C are permitted to "swap" time allocations for a given frame but only by moving one section at a time. Reference is made to FIGS. 6a–c for this embodiment. FIG. 6a shows the time allocation of the sections for each frame. As can be seen from this figure, the time sequence for display of the partitions is not altered, section A is displayed first, section B is displayed second and section C is displayed third for each frame. FIG. 6b shows the time allocation of the sections for each frame when the sections are permitted to "swap" time allocations by moving one section at a time. Thus if section C appears third in frame 1 then it could appear third or second in frame 2 but not first. Similarly if section A appears first in frame 2 it can appear first or second in frame 3 but not third. Thus the temporal update rate for any given section is never allowed to deviate by more than a factor of one-third the total frame period.

Figures 7A, 7B:
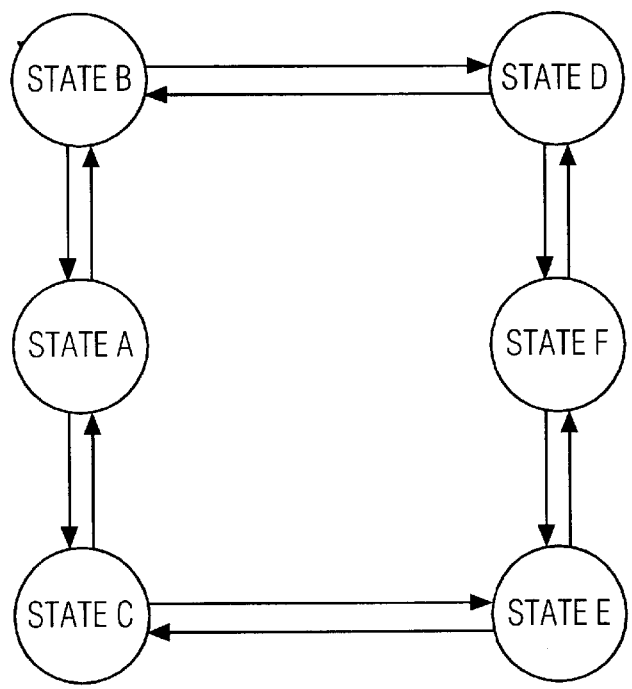
FIGS. 7a and b show a state diagram and table of the allowed transitions for the display shown in FIG. 5c.

FIG. 7 shows a state diagram of the allowed transitions. In accordance with the invention the pixel data is not generated in time-sequential order because the data are encrypted and the time order of the pixels as they are output from the video decoder are in an encrypted sequence.

Although the encrypted sequence appears random it still follows some type of "key". This means that the time order of the data might follow a pattern which would create a "scrambled" image where the pixels are not in the correct row sequential order or column sequential order and if the data were transferred to the array in a line-by-line pixel-by-pixel order the image would appear "scrambled." The pixel data would then be stored in the array of memory elements in apparently random locations. For example, assume the first pixel location is designated (0,0) for column 0 row 0, but, the pixel for the fourth column first row (4,1) is decoded for that location in the encrypted sequence. If the key is known, the data can be decrypted when it is loaded into the memory elements of the array 16 by column and row driver circuits 15 and 17 and then presented to the discrete display device for proper display.

Figure 4B:
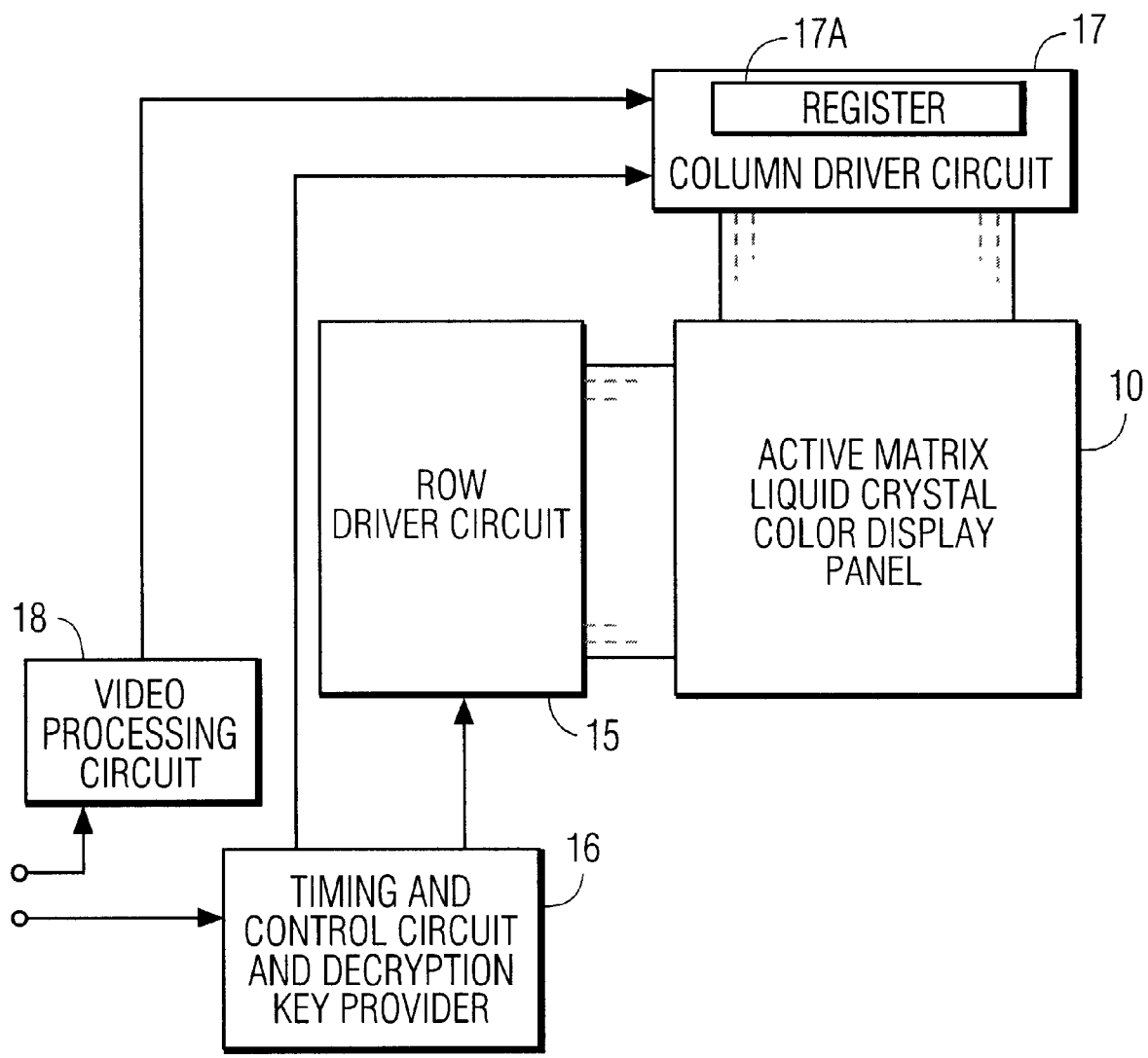
FIG. 4(b) is a diagram of a liquid crystal display device in accordance with the invention.

Referring now to FIG. 4(b) and assuming sections A, B and C are displayed in the same time sequential order for each frame (FIGS. 5a–d), the register 17A within the column driver circuit 17 will receive the first line of encrypted video for section A from the video processing circuit 18, e.g. row 1 if only the pixels within the row are encrypted and the time order of the rows within section A is sequential. The register 17A will supply, in accordance with a decryption key, the column driver circuit 17 with the decrypted video data. The column driver circuit 17 will activate the columns of the array 10 and the row driver circuit 15 will activate row 1. If the encrypted sequence for row 1 is pixels 13, 12, 15, 14, 11 the column driver circuit's storage device or register 17A receives the encrypted video line and provides it decrypted to the column driver circuit 17. The column driver circuit then provides the pixel information directly to the display device in its appropriate sequence 11, 12, 13, 14, 15. Examples of such registers or storage devices include a register that serially loads the column driver circuit 17 in accordance with the encryption key, or a memory having address lines which are accessed by the column driver circuit 17 in accordance with the decryption key. If the rows are also in an encrypted time sequence the row driver circuit 15 will just activate the appropriate row in accordance with the decryption key before the column driver circuit 17 begins loading. Thus, if the rows are to be activated in the order 5,3,1,2,4 rather than 1,2,3,4,5 the row driver circuit 15 must receive a decryption key so that instead of activating the rows sequentially it activates the rows in the order 5,3,1,2,4.

Since the LCD displays pixels line-by-line it is not necessary that the lines be displayed sequentially as long as some restrictions are followed to limit temporal artifacts and as long as the pixels within the line are decrypted before display.

Figure 8:
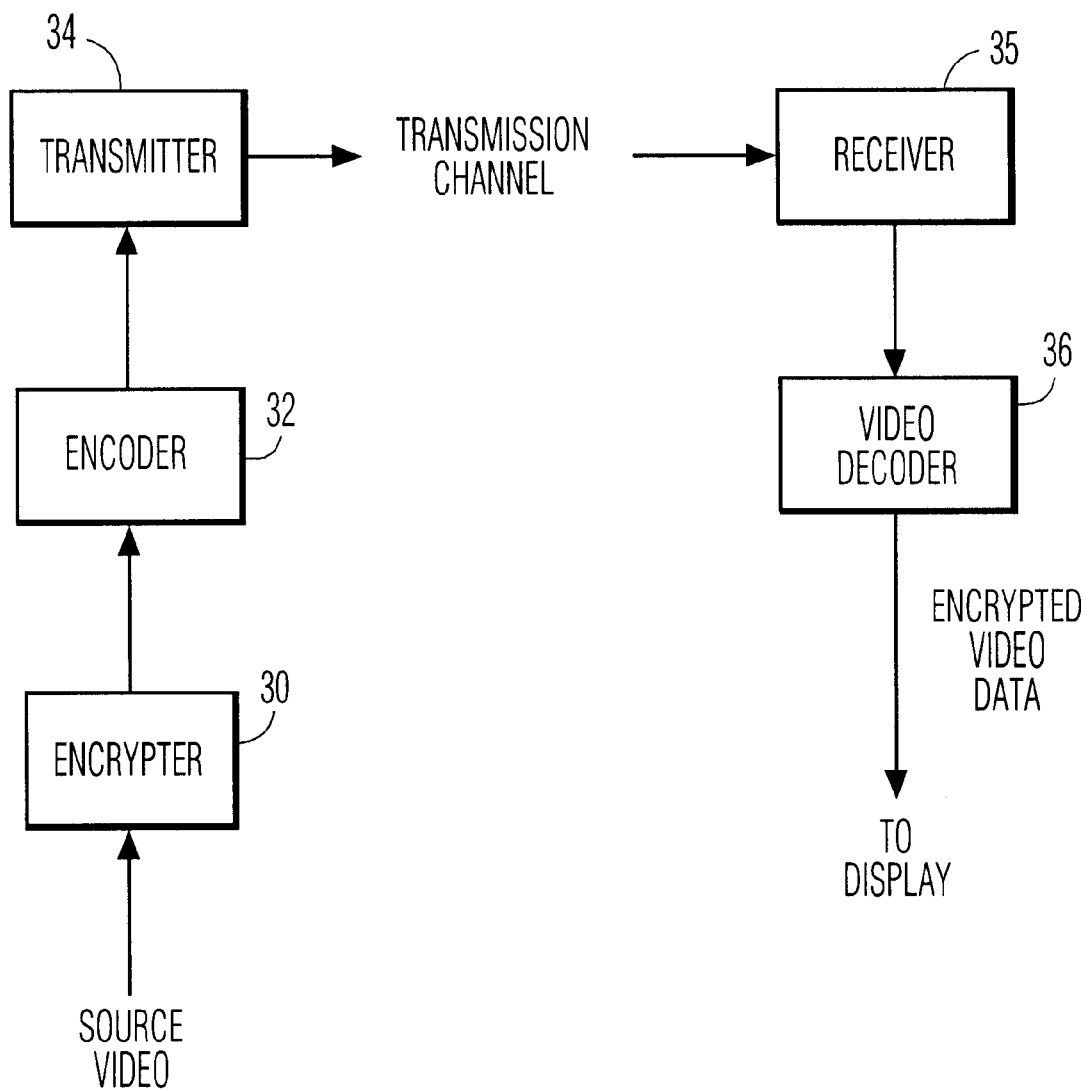
FIG. 8 shows the flow of video data in a television receiver in accordance with the invention.

FIG. 8 shows the flow of video data in a television receiver in accordance with the invention. The video is provided to a video encoder 30 for encoding and then to an encrypter 32. The encrypted and encoded video is then transmitted by transmitter 34 across the transmission channel to receiver 35. The receiver 35 supplies the encrypted and encoded video to video decoder 36. Although the video is decoded at video decoder 36, it is still in an encrypted form when it is supplied to the LCD display. The decryption occurs within the display device thus avoiding a signal in the clear at the video output jacks.

It will thus be seen that the objects set forth above, among those made apparent from the preceding description, are efficiently attained and, since certain changes may be made in carrying out the above method and in the construction set forth without departing from the spirit and scope of the invention, it is intended that all matter contained in the above description and shown in the accompanying drawings shall be interpreted as illustrative and not in a limiting sense.

We claim:

1. A display device for decrypting and displaying encrypted video pixel data without generating an in-the-clear video signal, comprising:

an array of p columns and 1 rows of pixel cells for displaying the decrypted video pixel data as a frame;

a register for storing at least a portion of a frame of digital code of the encrypted video pixel data in an encrypted order rather than in a column and row sequential order;

driver circuitry for activating the rows and columns of the array of pixel cells to thereby display the digital code stored in the register to selected ones of the pixel cells; and a decrypter which supplies a decryption key to the register such that the driver circuitry receives from the register a line of decrypted digital code and activates the columns of the array of pixel cells, and supplies the decryption key to the driver circuitry such that the driver circuit activates the rows of the array of pixel cells, one row at a time, non-sequentially in accordance with the decryption key.

2. The display device in accordance with claim 1, wherein the display device comprises a liquid crystal display (LCD) device.

3. The display device in accordance with claim 1, further comprising a timing device for providing timing pulses to the driver circuitry for activating the rows and columns of the array of pixel cells.

4. The display device in accordance with claim 1, wherein the digital code itself is encrypted for each pixel cell and the decryption key decrypts the digital code from the register before supplying it to the driver circuitry.

5. The display device in accordance with claim 1, wherein the display device is included within a television receiver.

6. A display device for decrypting and displaying encrypted video pixel data without generating an in-the-clear video signal, comprising:

an array of p columns and 1 rows of pixel cells for displaying the decrypted video pixel data as a frame;

a register for storing a line of a frame of digital code of the encrypted video pixel data in an encrypted order rather than in a column sequential order, and for decrypting the line of digital code in accordance with a decryption key;

driver circuitry for receiving the decrypted digital code from the register and for activating the rows and columns of the array of pixel cells for loading selected ones of the pixel cells with the digital code received from the register; and a decrypter which supplies the decryption key to the register such that the driver circuitry receives a line of decrypted digital code and activates the columns of the array of pixel cells and activates non-sequentially the rows, one row at a time for each line of digital code.

7. The display device in accordance with claim 6, wherein the timing of the driver circuitry for activating the rows and columns is provided by a timing circuit.

8. The display device in accordance with claim 6, wherein the display device is included within a television receiver.

9. A display device for decrypting and displaying encrypted video pixel data without generating an in-the-clear video signal, comprising:

an array of p columns and 1 rows of pixel cells for displaying the decrypted video pixel data as a frame;

a register for storing at least a portion of a frame of digital code of the encrypted video pixel data in an encrypted order rather than in a column and row sequential order;

driver circuitry for activating the rows and columns of the array of memory elements for loading selected ones of the pixel cells with the digital code stored in the register; and a decrypter which supplies the decryption key to the register such that the driver circuitry receives from the register a line of decrypted digital code and activates the columns of the array of pixel cells, and supplies the decryption key to the driver circuitry such that the driver circuit activates the rows of the array of pixel cells, one row at a time, non-sequentially in accordance with the decryption key, wherein:

each frame of encrypted video data is received in predetermined partitions, and the rows within each partition are displayed non-sequentially but the partitions are displayed sequentially.

10. The display device in accordance with claim 9, wherein the partitions are displayed non-sequentially.

11. The display device in accordance with claim 10, wherein the partitions are displayed non-sequentially in accordance with a time order from frame to frame that minimizes temporal artifacts.

12. The display device in accordance with claim 11, wherein a first partition is displayed in one frame in a time order different than displayed in a next frame but wherein the timing between display of the first partition in each frame does not deviate substantially from the frame period.

13. The display device in accordance with claim 12, wherein the display device is included within a television receiver.

14. A method for decrypting and displaying encrypted video pixel data without generating an in-the-clear video signal, comprising:

receiving encrypted video pixel data including digital code for each pixel to be displayed decrypted on an array of p columns by 1 rows of pixel cells as a frame;

storing at least a portion of a frame of the digital code of the encrypted video pixel data in a register, such that the encrypted video data is stored in the register in an encrypted order rather than in a column or row sequential order;

decrypting the encrypted video pixel data in accordance with a decryption key and supplying the decrypted video data to driver circuitry; and providing the decrypted video pixel data from the driver circuitry to the array of pixel cells;

wherein the step of providing requires activating the columns of the array of pixel cells for loading selected ones of the pixel cells with the stored digital code from the driver circuitry, and activating the rows of the array of pixel cells, one row at a time, non-sequentially in accordance with the decryption key.

15. A method for decrypting and displaying encrypted video pixel data without generating an in-the-clear video signal, comprising:

receiving encrypted video pixel data including digital code for each pixel to be displayed decrypted on an array of p columns by 1 rows of pixel cells as a frame;

storing at least a portion of a frame of the digital code of the encrypted video pixel data in a register, such that the encrypted video data is stored in the register in an encrypted order rather than in a column or row sequential order;

decrypting the encrypted video pixel data in accordance with a decryption key and supplying the decrypted video data to driver circuitry; and providing the decrypted video pixel data from the driver circuitry to the array of pixel cells;

wherein the step of providing requires:

activating the columns of the array of pixel cells with the stored digital code from the driver circuitry; and activating non-sequentially one row at a time for each line of digital code.

\* \* \* \* \*